Figure 1:
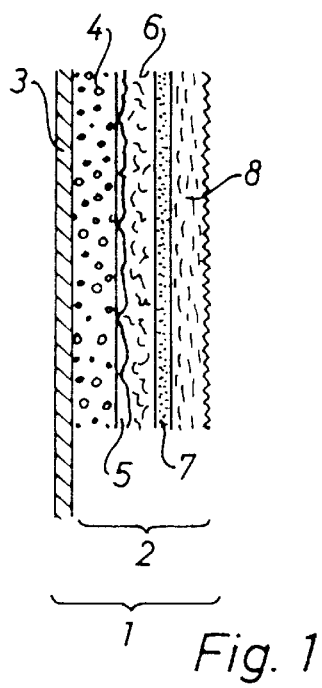

United States Patent [19]
Alts

[11] Patent Number: 6,145,617
[45] Date of Patent: Nov. 14, 2000

[54] ULTRA-LIGHT, MULTIFUNCTIONAL SOUND-INSULATING KIT

[75] Inventor: Thorsten Alts, Bieberau, Germany

[73] Assignee: Rieter Automotive AG, Zollikon, Switzerland

[21] Appl. No.: 09/269,601

[22] PCT Filed: Oct. 29, 1997

[86] PCT No.: PCT/CH97/00412

§ 371 Date: Mar. 24, 1999

§ 102(e) Date: Mar. 24, 1999

[87] PCT Pub. No.: WO98/18657

PCT Pub. Date: May 7, 1998

[30] Foreign Application Priority Data

Oct. 29, 1996 [AT] Austria ........................................ 381/96

[51] Int. Cl.⁷ .................................................. E04B 1/82
[52] U.S. Cl. ........................................ 181/290; 286/294
[58] Field of Search ................................... 181/286, 290, 181/294, 296; 428/903; 442/346, 378, 398, 57

[56] References Cited

U.S. PATENT DOCUMENTS 5,298,694  3/1994  Thompson et al. ...................... 181/286
5,493,081  2/1996  Manogold ............................... 181/286

Primary Examiner—Khanh Dang
Attorney, Agent, or Firm—Nath & Associates

[57] ABSTRACT

A kit for reducing noise in motor vehicles having at least one areal vehicle part, the kit having a sound-insulating assembly package having several layers and an at least partly interlaying air layer. This assembly package has at least one porous cushioning layer, a microporous reinforcing layer which is lightweight, stiff and openly porous, an air flow resistance between $R_r=500$ Nsm$^{-3}$ and $R_r=2,500$ Nsm$^{-3}$, and a surface area of mF=0.3 kg/m² to mF=2.0 kg/m². The reinforcing layer has a stiffness of B=0.05 Nm to B=10.5 Nm. This permits replacing the weight of classic spring-mass-systems for noise reduction in vehicles with a system at least 50% lighter. In addition to the dampening effect on oscillations, this kit absorbs sound and provides thermal insulation. Preferably, this multifunctional, ultralight kit is used to insulate the floor or firewall, or as a door lining or roof inner lining.

101 Claims, 7 Drawing Sheets

ULTRA-LIGHT, MULTIFUNCTIONAL SOUND-INSULATING KIT

The present invention relates to a multifunctional kit for the noise reduction and heat insulation in vehicles, according to the preamble of claim 1.

Large areal vehicle parts, such as floor sheeting, roof sheeting, boot lids, end faces or doors and side coverings tend to deform, vibrate and oscillate on travelling on account of their low inherent stability. This behaviour is conventionally counteracted by mounting damping material, in particular of heavy layers of bitumen. In order to reduce the transmission of travelling noises in the inside of the vehicle, in the automobile industry, since a long time, additionally, multi-layered sound insulation assemblies have been applied. In particular by way of these sound insulation assemblies, noises from the vehicle motor, from the gearbox and auxiliary units, from exhaust systems but also wind and tire noises are effectively insulated. These sound insulating assemblies as a rule are conceived as spring-mass-systems and all comprise an airtight heavy layer coupled to an elastic spring layer in order to damp the vibrations of the large areal car body parts and to insulate the airborne noise.

Such a sound insulating package is for example described in EP-0'334'178 and comprises essentially a soft-elastic foam material layer which faces the car body part capable of oscillation and which acts as the spring of the spring-mass system, an almost compact, air-impermeable and consolidated layer of the same material, which acts as the mass of the spring-mass-system, wherein this for consolidation is incorporated into a frame of fleece or cut foam, as well as a decor covering or carpet layer arranged thereabove. By way of this construction the weight of the heavy layer may be reduced up to 40% and thus also the weight of the whole sound insulation system may be reduced with respect to the known spring-mass-systems, but however at the cost of the acoustic effectiveness.

In EP-0'255'332 a sound insulating package is disclosed which with the help of a semi-flexible carrier layer, in the manner of a snap closure, is tensioned against the vehicle roof. With this carrier layer a classic spring-mass-system of a resilient, sound-absorbing foam layer and of a visco-elastic, closed-pored heavy layer (filled with bitumen) is pressed against the vehicle roof. By way of the non-positive connection of the heavy layer to the vehicle roof the vibrations of this are damped better and the heavy layer no longer needs to cover the whole surface.

Generally spring-mass arrangements however lead to the onset of resonance in the sound insulation, which usually lie in the frequency range of the lower motor arrangements and here are particularly undesirable. This phenomenon as a rule forbids an extremely light construction.

It is the general desire of the automobile industry to reduce the weight of vehicles. This has the result that increasingly also thinner and lighter car body parts are applied, which leads to considerable acoustic disadvantages. The demands on the sound insulation assemblies are significantly increased by the use of lightweight car body parts.

It is therefore the object of the invention to provide an ultra-light kit which also with lightweight car body parts, for example of aluminium or plastic, has no loss of acoustic effectiveness.

In particular a sound-insulating kit is to be provided which is more than 50% lighter than conventional sound-insulating assemblies and furthermore has good heat-insulating properties.

According to the invention this object is generally achieved by a kit with the features of claim 1 and is particularly achieved in that the air-impermeable heavy layer with conventional spring-mass systems is replaced by a relatively thin, micro-porous and stiff fibre layer, or fibre/foam composite layer. This micro-porous fibre layer is open-pored and has a relatively high airflow resistance. Essential for the solution of the object set is the formation of an air layer in the sound-absorbing kit, the air layer preferably lying between the areal car body part and the other layers. As a result basically the weight of the insulating mechanism with conventional spring-mass-systems is reduced in favour of an improved sound absorption. The effectiveness of the kit according to the invention thus involves an optimal combination of sound insulation and absorption. The considerable increase of the absorption coefficients achieved according to the invention leads to the fact that this kit has an extremely light construction and also with lightweight car body parts have no reduction in the acoustic effectiveness. Furthermore with the kit according to the invention surprisingly it has been found that there is also a considerable improvement of the insulation in the region of the normally occuring onset of resonance.

In a first embodiment form the multi-functional kit according to the invention comprises essentially a soft-elastic, open-pored, spring layer facing the car body part capable of oscillation, this layer consisting of foam or fibre fleece, a microporous and light stiffening layer, in particular a stiffly pressed fibre layer or fibre/foam composite layer, as well as a porous cover layer or carpet or protective layer arranged thereover. All these layers may be connected to one another to a composite part mechanically (stitched), or by partial air-permeable adhesings. In a further formation of this embodiment form the kit according to the invention on the car body side comprises a light damping layer which is applied in a partial or complete-surfaced manner, which preferably has a surface pattern according to patent EP 0 474 593 and is applied onto the car body sheeting. In flat regions of the car body a light "constrained-layer" damping of ultra-light bitumen and of a tension resistant foil of aluminium or fibre-reinforced plastic paper may be applied. This is conventionally adhesed to the plating.

Further preferred embodiment forms are specified in the dependent claims of the present application.

By way of the acoustic optimisation of the soft-elastic, open-pored layer combined with the likewise open-pored, microporous fibre layer or fibre/foam composite layer arranged thereover, one obtains a) a sound insulation without the onset of resonance, b) a sound absorption on the decor or carpet side, which is already effective in the low frequency region, c) a heat insulation which is advantageous with vehicles with a very low fuel consumption and d) a considerable reduction in weight of more than 50% in comparison to the classic spring-mass construction with vehicles with a steel car body, and with a simultaneously improved acoustic overall effectiveness.

Figure 2:
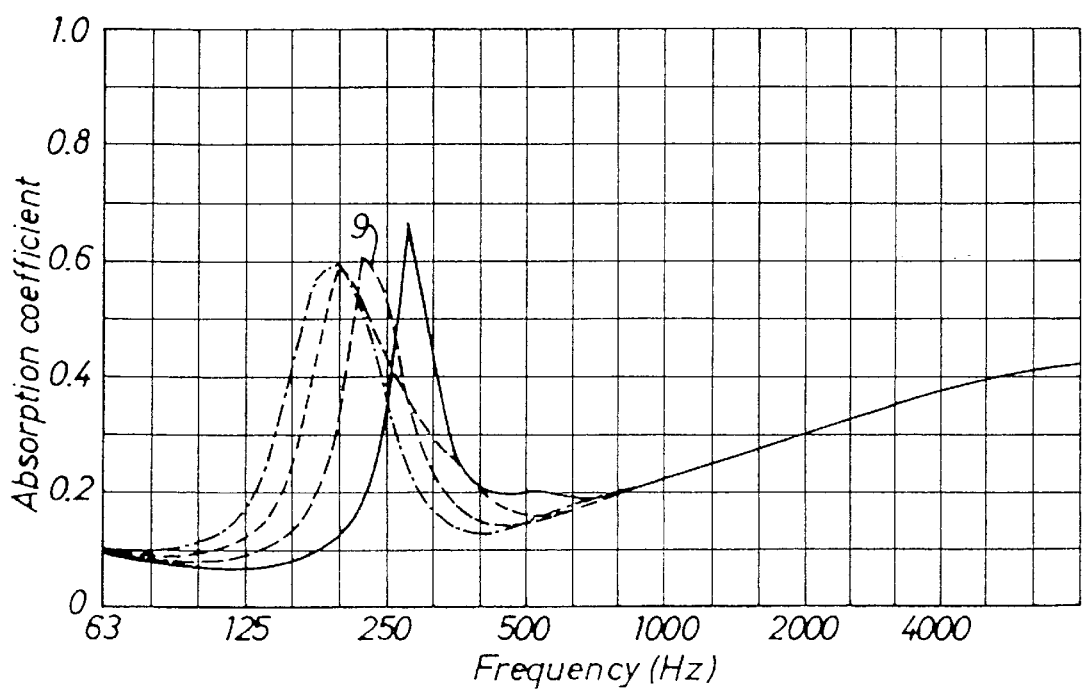
Figure 3:
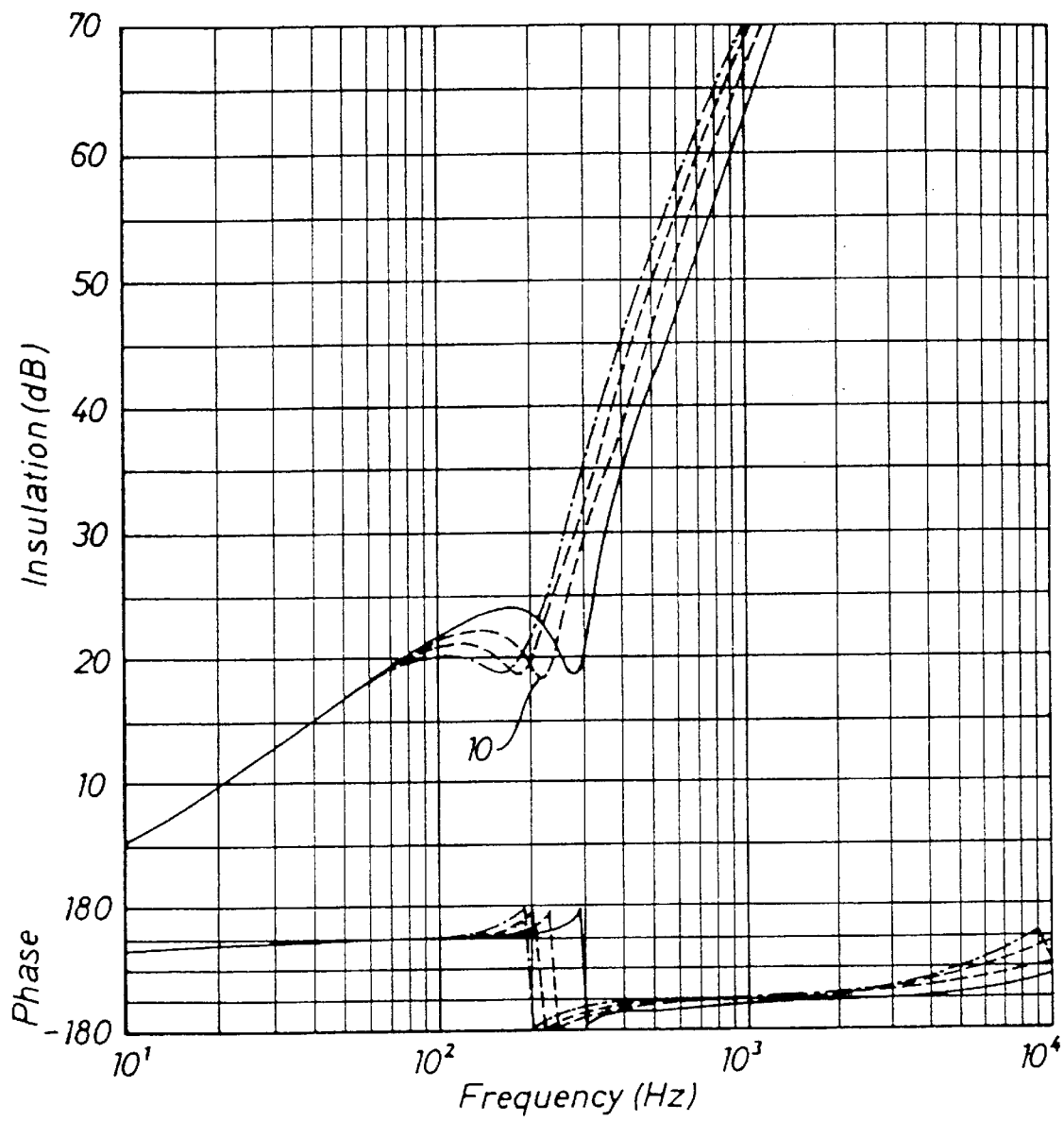
Figure 4:
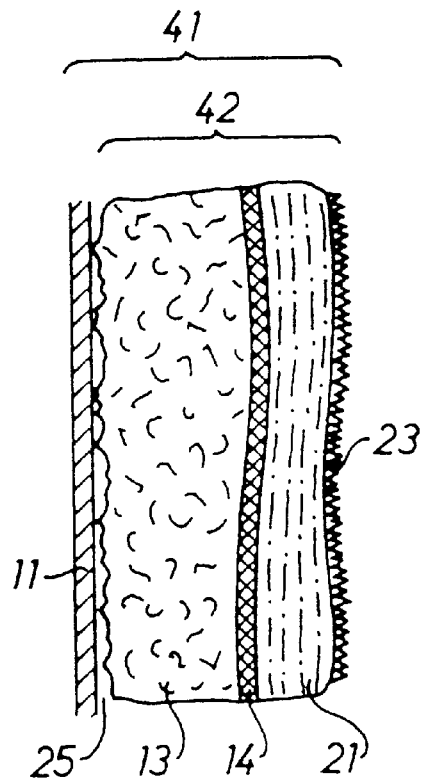
Figure 5:
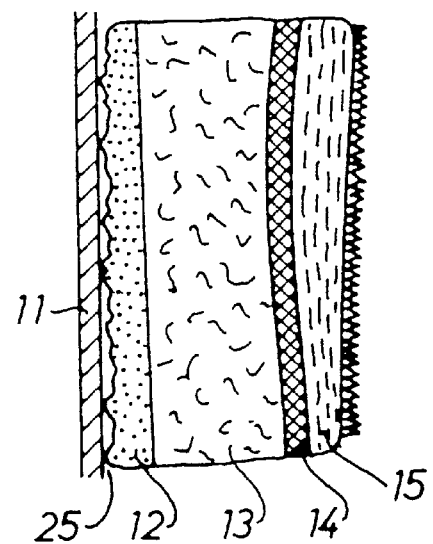
Figure 6:
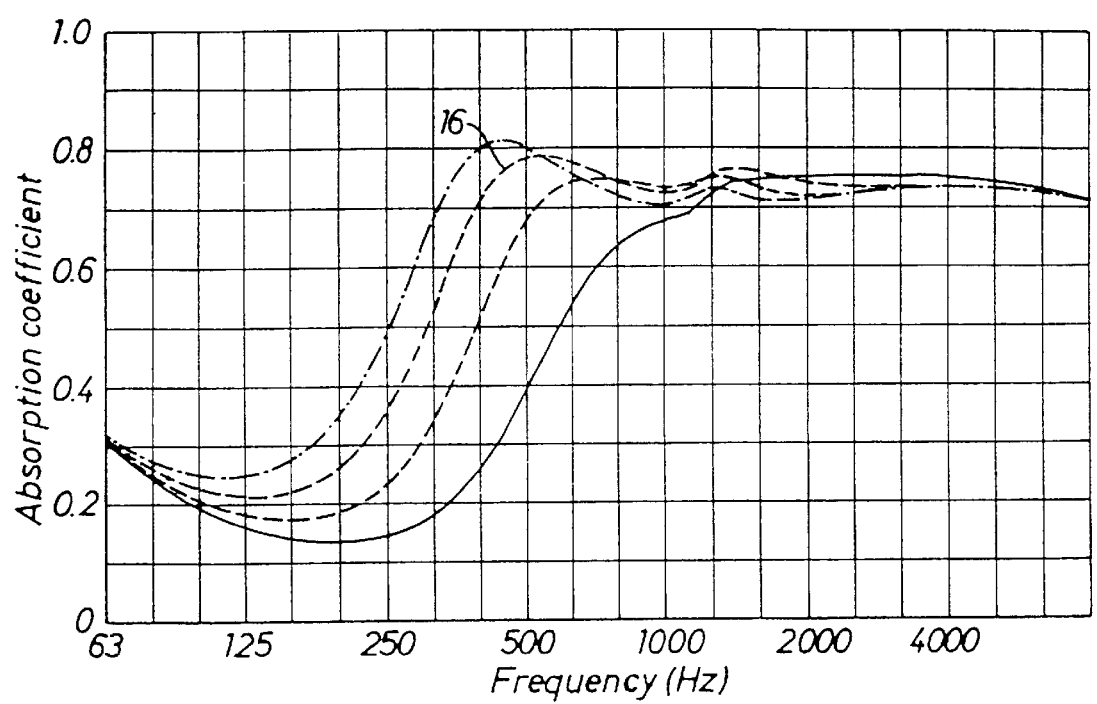
Figure 7:
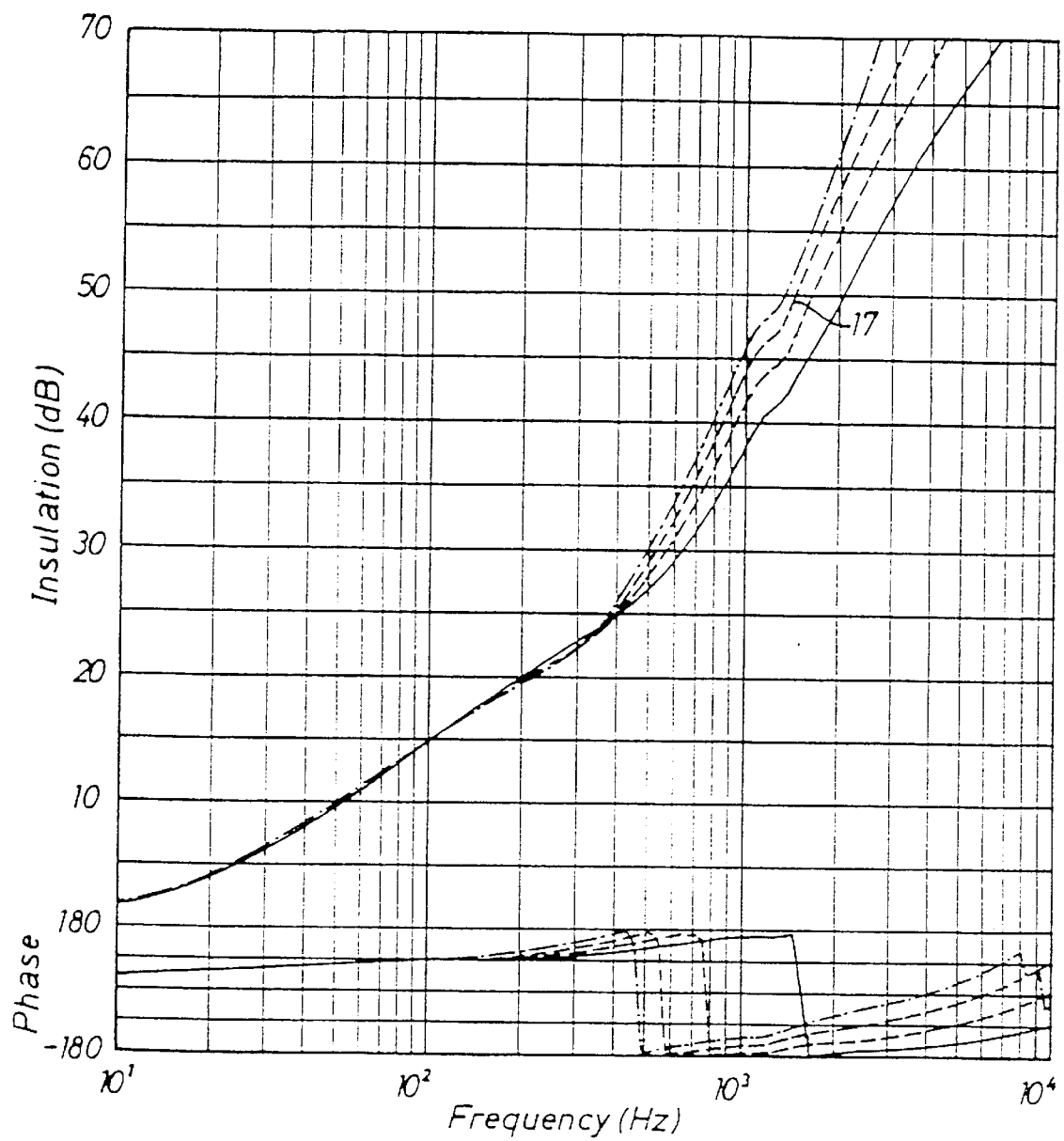
Figure 8:
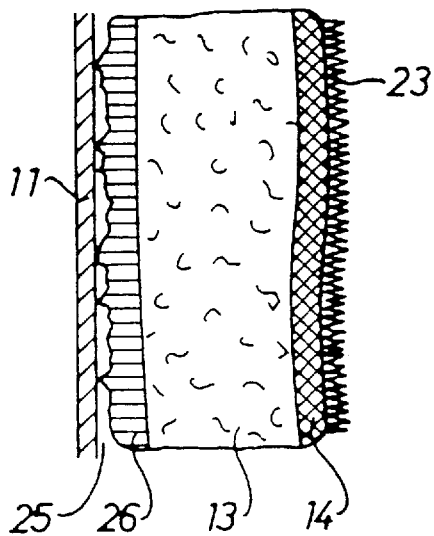
Figure 9:
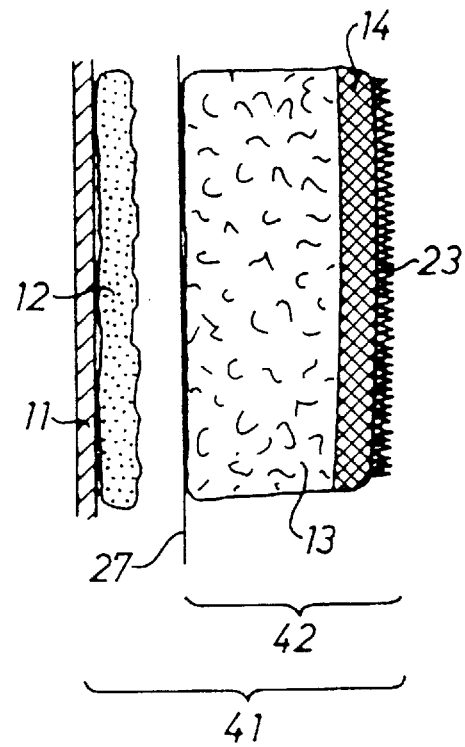
Figure 10:
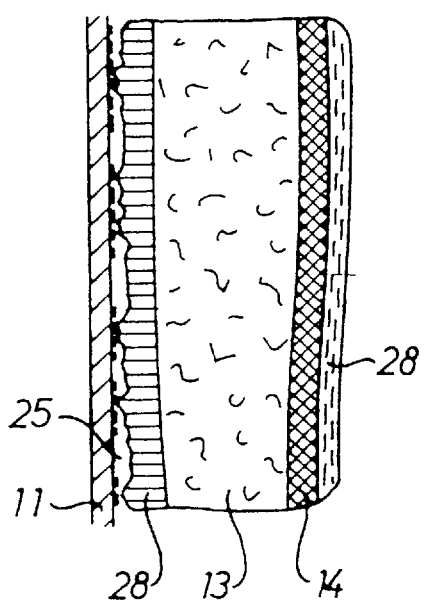
Figure 11:
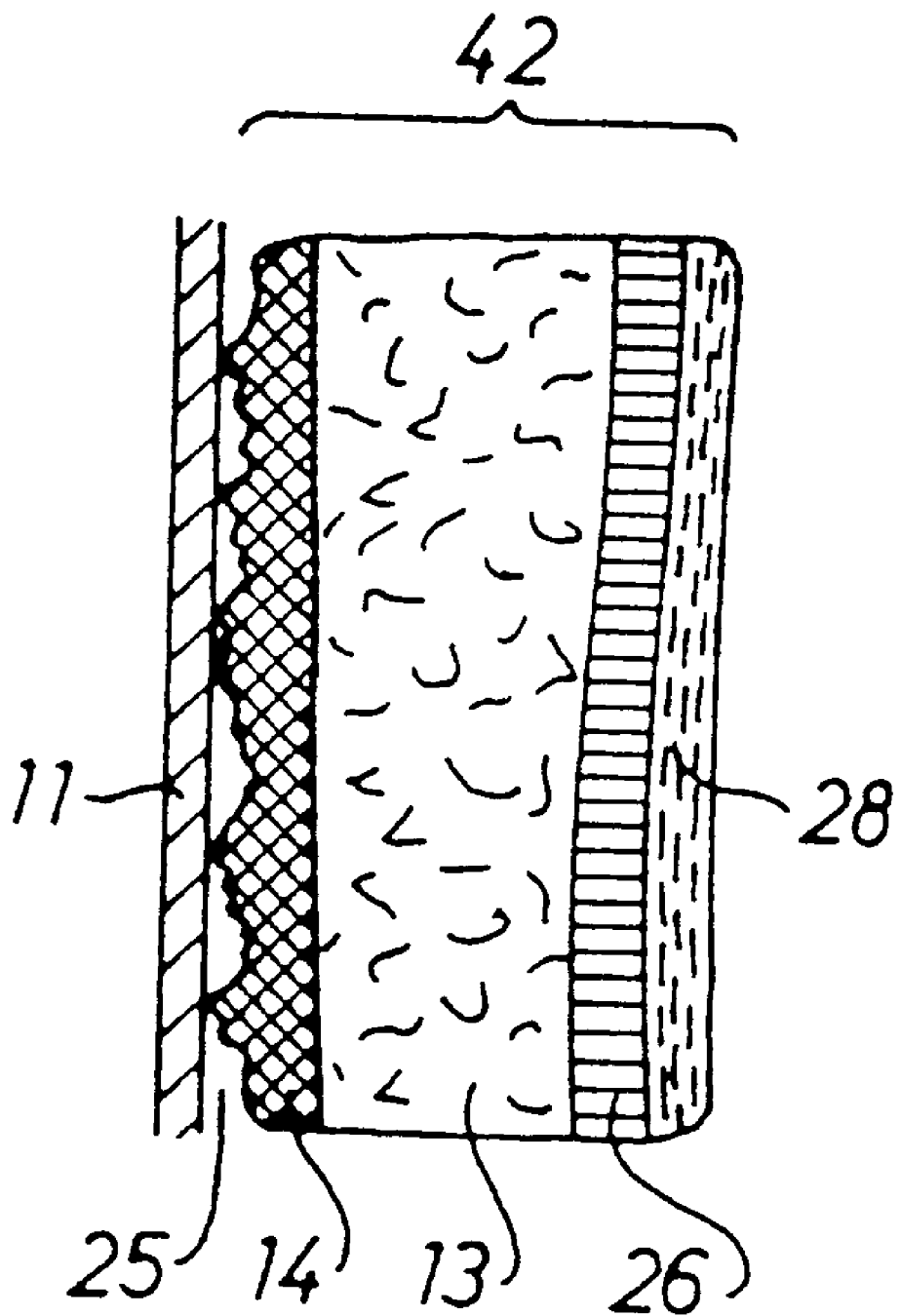

Subsequently the invention is explained in more detail by way of a few embodiment examples and with the help of figures. With this there are shown:

FIG. 1: a classic construction of a floor group;

FIG. 2: the course of the absorption coefficients as a function of the frequency for the floor group according to FIG. 1;

FIG. 3: the course of the insulation as a function of the frequency for the floor group according to FIG. 1;

FIG. 4: the principle construction of the kit according to the invention;

FIG. 5: a kit according to the invention for the floor insulation or inner end wall covering;

FIG. 6: the course of the absorption coefficient as a function of the frequency for the kit according to FIG. 5;

FIG. 7: the course of the insulation as a function of the frequency for the kit according to FIG. 5;

FIG. 8: a construction through a roof inner covering according to the invention;

FIG. 9: a construction through a dooor covering according to the invention;

FIG. 10: a construction through an adhesed outer end wall according to the invention;

FIG. 11: a construction through an applied outer end wall according to the invention;

The conventional floor group 1 shown in FIG. 1 comprises a sound insulating package 2 constructed of several layers, which is fastened on a flat, i.e. areal car body part 3. With conventional vehicles this car body part is manufactured of an approximately 0.8 mm thick steel sheeting, which has an area-weight of approx. 6.32 kg/m². On this car body part 3 there is mounted a damping layer 4, as a rule an approx. 2.2 mm thick bitumen-layer, with approx. 3.5 kg/m² surface weight. With this damping layer 4 essentially high frequeny oscillations are damped. Onto this damping layer as a rule a spring-mass system is loosely applied so that between the damping layer 4 and the spring-mass system there arises an approx. 0.2 mm thick air layer 5. The spring-mass system comprises an approx. 15 mm thick fibre layer 6 with a spacial weight of approx. 70 kg/m³ or an area-weight of appprox. 1.05 kg/m². Insead of this fibre layer 6 also similarly heavy elastic foam layers are used. Connected to this is an approx. 2 mm thick, air-impermeable heavy layer 7 with an area-weight of approx. 4.0 kg/m² on which in turn there is deposited for example an approx. 5.0 mm thick carpet 8 of approx. 0.6 kg/m² surface weight. This classic floor group thus comprises a total surface weight of approx. 15.47 kg/m² of which the area-weight of the sound insulation package 2 constitutes a part of approx. 9.15 kg/m².

The curve 9 represented in FIG. 2 shows the behaviour of the absorption coefficients as a function of the frequency of this floor group 1. From this it can be clearly recognised that this sound insulation package in the region of 200 Hz comprises a marked resonance absorption, and in the region above 500 Hz shows a clearly worse absorption which with an increasing frequency improves slightly. This slightly increasing absorption is only caused by the properties of the carpet.

The frequency course 10 of the insulation, which is represented in FIG. 3 and belongs to this floor group 1 clearly illustrates the insulation of the high frequency sound, and shows an onset of insulation in the region of 200 Hz which is characteristic for all spring-mass systems.

With the use of approx. 1.1 mm thick aluminium sheeting instead of the approx. 0.8 mm thick steel sheeting as a car body part 3 with these conventional insulation systems the complete insulation is worsened by approx. 6 dB and the onset of resonance of the insulation and the resonance absorption are displaced to somewhat higher frequencies in the region about 250 Hz. This is as a result of the halving in mass with the use of aluminium instead of steel.

The principle construction of the kit 41 according to the invention shown in FIG. 4 comprises essentially an areal vehicle part 11 and an assembly package 42 bearing thereon. This assembly package 42 comprises several layers and by necessity a porous spring layer 13 and a microporous stiffening layer 14. The porous spring layer 13 is preferably formed from an open-pored foam layer. The microporous stiffening layer consists preferably of an open-pored fibre layer or fibre/foam composite layer which has a total airflow resistance of $R_t=500$ Nsm$^{-3}$ to $R_t=2500$ Nsm$^{-3}$, in particular from $R_t=900$ Nsm$^{-3}$ to $R_t=2000$ Nsm$^{-3}$, and an areal-mass of $m_F=0.3$ kg/m² to $m_F=2.0$ kg/m², in particular of $m_F=0.5$ kg/m³ to $m_F=1.6$ kg/m². For helping, further layers 21 and 23 may be deposited. Essential to the acoustic effectiveness of the multifunctional kit 41 is an air layer 25 between the assembly package 42 and the areal vehicle part 11. In order to further improve this acoustic effectiveness the microporous stiffening layer 14 has a bending stiffness of $B=0.005$ Nm to $B=10.5$ Nm, in particular from $B=0.025$ Nm to $B=6.0$ Nm.

The ultralight kit according to the invention, according to FIG. 5 is particularly suitable for the construction of a floor insulation or the inner end wall covering. It comprises an approx. 1.1 mm thick aluminium car body part 11, on which there is applied a light damping layer 12, for example an SDL damping layer, whilst forming an air layer 25. Such SDL damping layers are known and as a rule have a surface pattern according to the patent EP 0 474 593 and a special bitumenous material composition. These are applied with the pattern onto the sheeting and are rigidly connected to the soft foam system. The effective density of this damping layer 12 is $\rho=1100$ kg/m³. In the present embodiment example an approx. 2.0 mm thick damping layer with an area-weight of approx. 2.4 kg/m² is used. Onto this there is applied an approx. 25 mm thick layer of moulded foam 13 with a spacial weight of approx. 20 kg/m³, or with an area-weight of approx. 0.4 kg/m² to 1.75 kg/m². This moulded foam layer 13 is in particular a thermomoulded foam layer and is open-pored and is connected to an approx. 1.5 mm to 5.0 mm thick microporous, stiff fibre layer 14 of approx. 0.6 kg/m² to 1.6 kg/m² surface weight. Suitable as a damping layer are also ultra-light, bitumenous damping layers of several layers, which for example comprise an aluminium foil or fibre-reinforced plastic paper or bitumen-free damping materials, for example EPDM or moulded foam with an effective spacial weight of approx. 40 kg/m³. The microporous fibre layer 14 is of the type such that this has a total airflow resistance of $R_t=500$ Nsm$^{-3}$ to $R_t=2500$ Nsm$^{-3}$, in particular from $R_t=900$ Nsm$^{-3}$ to $R_t=2000$ Nsm$^{-3}$, and an areal-mass of $m_F=0.3$ kg/m² to $m_F=2.0$ kg/m², in particular of $m_F=0.5$ kg/m² to $m_F=1.6$ kg/m² and a bending stiffness of $B=0.005$ Nm to $B=10.5$ Nm, in particular of $B=0.025$ Nm to $B=6.0$ Nm. This microporosity and stiffness are essential for the absorption capability of the whole assembly package and may be achieved by way of a suitable choice of various materials. With the application as floor insulation a carpet or decor layer 15 is connected to this microporous, stiff fibre layer 15 on the side of the vehicle passenger space and in this embodiment example has a thickness of approx. 5 mm or an area-weight of approx. 0.6 kg/m². The assembly package 42 according to the invention thus weighs only approx. 4.1 kg/m² and permits the weight of the complete floor group to be reduced from approx. 15.47 kg/m² to approx. 7.07 kg/m². With the application of this kit 41 as an inner end wall, the decor layer or carpet layer may be done away with.

The frequency dependent course 16 of the absorption coefficients shown in FIG. 6 clearly illustrates the special frequency course for the kit 41 according to the invention with an approx. 1.1 mm thick aluminium sheeting: perfect sound absorption in the middle frequency range and constant, not too large an absorption of $\alpha=0.7$ to $\alpha=0.8$ in the high frequency range. This is necessary for maintaining the ability to understand conversation in the vehicle.

The course 17 of the frequency dependent insulation of the kit 41 according to the invention, which can be deduced from FIG. 7 clearly no longer shows any onset of resonance, as occurs as a matter of course with the conventional spring-mass-systems in the region of 200 Hz.

A further application of the kit 41 according to the invention for the insulation of a roof inner covering (sky roof) is shown in FIG. 8. This comprises an approx. 2 mm thick carrier layer 26 of a highly pressed fibre material with an area-weight of approx. 0.5 kg/m². As a subsequent layer there is an approx. 15 mm thick foam layer 13 with a spacial weight of approx. 20 kg/m³. This foam or moulded foam layer according to the invention carries a stiffening layer 14, in particular a microporous fibre layer of approx. 1.5 mm thickness and approx. 0.4 kg/m³ surface weight. A porous, in particular open-pored, soft decor layer 23 of approx. 2 mm thickness or approx. 0.21 kg/m² surface weight closes this sound absorbing and oscillation damping, self supporting sky roof design. This multifunctional kit according to the invention thus comprises a complete thickness of approx. 24.5 mm and a complete surface weight of approx. 1.56 kg/m² and acts in the same manner as the previously described embodiment example. Further embodiment forms for the construction of a roof inner covering according to the invention are defined in more detail in the dependent claims 21 to 24.

It is to be understood that this roof inner covering may also be provided with a damping layer, in particular with an approx. 4 mm thick foam damping with a surface pattern according to EP 0 474 593 and with an area-weight of approx. 0.15 kg/m².

In an alternative embodiment form of this roof inner covering the carrier layer 26 may be left out and the assembly package 42, whilst forming an air layer 25, is directly adhesed to the areal vehicle part 11. By way of this, although the oscillation damping of the aluminium roof is reduced and the sound insulation, in particular with rain or tunnel journeys, is somewhat reduced, however with this still a sufficiently effective kit according to the invention with a thickness of approx. 18.5 mm and an area-weight of approx. 0.91 kg/m² may be realised.

The kit 41 according to the invention may also be applied to door coverings and comprises in one embodiment form according to FIG. 9 an approx. 2.4 mm thick, multi-layered damping layer which consists of an ultra-light bitumenous damping material and at least on approx. 0.1 mm thin aluminium foil. Such multi-layered damping systems directly adhesed to the sheeting are known. They are however as a rule at least 4 kg/m² heavy. The applied system according to the invention has an area-weight of still only approx. 2.67 kg/m² with a better damping efficiency than conventional systems. Subsequently there follows an air gap 25 of a variable thickness. This may in particular be used in order to accommodate the mechanics of the window. The actual assembly package 42 is protected against damp and contamination by a 25 μm thin PU-foil 27 with an area-weight of approx. 0.03 kg/m². The porous spring layer 13 and the microporous stiffening layer 14 are formed according to the features of claims 26 to 29. This layer sequence is closed on the passenger space side by an approx. 2 mm thick porous cover layer 23, in particular an open-pored decor layer, with an area-weight of approx. 0.21 kg/m². Thus this assembly package comprises an area-weight of approx. 3.51 kg/m². It is to be understood that this assembly package 42 may only be mounted partially and preferably only in the areal regions of the door.

It is to be understood that this kit 41 may also be provided with a damping layer 12 between the areal vehicle part 11, this consisting either of multi-layered, approx. 2.3 mm thick ultra-light damping material with an area-weight of approx. 2.67 kg/m² and with at least one, approx. 0.1 mm thin aluminium foil, or of a multi-layered, approx. 2.3 mm thick, ultra-light damping material with an area-weight of approx. 2.67 kg/m² and with at least one approx. 0.1 mm thin foil of fibre reinforced plastic paper. Thus the area-weight of the multi-layered damping layer is approx. 2.54 kg/m².

The kit 41 according to the invention may also be applied as the outer end wall covering, as is shown in FIGS. 10 and 11. The assembly package used for this comprises on the side of the motor space a dirt-resistant protective layer 28, in particular an oil and water resistant protective fleece. The microporous stiffening layer 14 is arranged between the spring layer 13 and this protective layer, wherein the stiffening layer consists of a highly pressed fibre material with a thickness of approx. 2.5 mm and an area-weight of approx. 1.0 kg/m², the open-pored spring layer of the assembly package 42 either consisting of an approx. 15 mm thick thermomoulded foam with an area-weight of approx. 0.3 kg/m², or of an approx. 15 mm thick PU moulded foam with an area-weight of approx. 0.6 kg/m² to 0.9 kg/m², or of an approx. 15 mm thick duroplastic mixed fibre fleece of heat resistant fibres and with an area-weight of approx. 0.7 kg/m² to 1.0 kg/m². The protective layer on the motor space side comprises a thickness of 0.2 to 0.4 mm and an area-weight of 0.1 to 0.3 kg/m². With this embodiment form the assembly package 42 is adhesed in a simple manner to the areal vehicle part 11 whilst forming an air layer 25.

In one further embodiment form of this assembly package 42 used as an outer end wall covering, as is shown in FIG. 11, the microporous stiffening layer 14 lies between the porous spring layer 13 and the air layer 25. Again the open-pored spring layer of the assembly package may consist of a thermomoulded foam, of a PU moulded foam or of a duroplastic mixed fibre fleece, and on the motor space side is provided with a protective layer 28. This assembly package 42 may be adhesed to the areal vehicle part 11 or only layed on. In order to lay on the assembly package in a stable manner, this comprises a carrier layer 26. It is to be understood that with these embodiment forms between the assembly package 42 and the air layer 25 there may also be provided a foam damping, which comprises a thickness of 3 mm and an area-weight of approx. 0.12 kg/m².

The advantages of the kit according to the invention are particularly evident with the application of thin steel sheeting or light aluminium sheeting or organo-sheeting, as is favourably used today in the automobile industry. A further advantage of the kit according to the invention lies in the extremely low heat conductability of the applied porous spring layer, which leads to the fact that this kit apart from its good acoustic effectiveness also has a good heat insulation.

What is claimed is:

1. A multi-functional insulation for use in vehicles, which is sound-absorbing, sound-insulating, oscillation-damping and heat-insulating, for use as a floor insulation, an end wall insulation, a door covering, or a roof inner covering, in combination with at least one sheet-like vehicle part and having a noise-reducing assembly package of several layers, the assembly package comprising:

at least one porous resilient layer;

a microporous stiffening layer which has a total airflow resistance of $R_f=500$ Nsm$^{-3}$ to $R_f=2500$ Nsm$^{-3}$, and an areal-mass of $m_F=0.3$ kg/m² to $m_F=2.0$ kg/m²;

wherein between the assembly package and the sheet-like vehicle part there is provided an air layer; and wherein said multi-layered assembly package is a heavy-layer free package.

2. The multi-functional insulation according to claim 1 wherein the microporous stiffening layer has a bending stiffness of B=0.005 Nm to B=10.5 Nm.

3. The multi-functional insulation according to claim 1 wherein the assembly package further comprises a porous cover layer selected from the group comprising: a soft decor layer, a carpet layer, or a dirt-resistant protective fleece.

4. The multi-functional insulation according to claim 1 wherein the at least one porous resilient layer is disposed between the air layer and the microporous stiffening layer.

5. The multi-functional insulation according to claim 1 wherein the porous resilient layer comprises a thermomoulded foam with a density of $\rho \leq 30$ kg/m$^3$.

6. The multi-functional insulation according to claim 1 wherein the porous resilient layer comprises a PU moulded foam with a density of $\rho \leq 70$ kg/m$^3$.

7. The multi-functional insulation according to claim 1 wherein the porous resilient layer comprises a thermoplastic mixed fibre fleece with a density of $\rho \leq 70$ kg/m$^3$.

8. The multi-functional insulation according to claim 1 wherein the porous resilient layer comprises a duroplastic fibre fleece with a density of $\rho \leq 70$ kg/m$^3$.

9. The multi-functional insulation according to claim 5, further comprising a damping layer, at least a portion of which is disposed between the assembly package and the sheet-like vehicle part.

10. The multi-functional insulation according to claim 9, wherein the damping layer has a thickness of about 2.2 mm and comprises an ultra-light damping material with an area-weight of about 2.4 kg/m$^2$, wherein:
the damping layer is adhesed onto the sheet-like vehicle part;
the air layer, formed between the assembly package and the damping layer by a relief-like support of the assembly package has a thickness of about 0.2 mm.

11. The multi-functional insulation according to claim 9, wherein the damping layer comprises a multi-layered, ultra-light damping material comprising:
at least an about 0.2 mm thin aluminum foil and having an area-weight of about 2.94 kg/m$^2$; wherein
the damping layer is adhesed onto the sheet-like vehicle part;
the air layer, formed between the assembly package and the damping layer by a relief-like support of the assembly package, has a thickness of about 0.2 mm.

12. The multi-functional insulation according to claim 9, wherein the damping layer comprises a multi-layered, ultra-light damping material comprising:
at least an about 0.2 mm thin fibre-reinforced plastic paper and having an area-weight of about 2.67 kg/m$^2$; wherein
the damping layer is adhesed onto the sheet-like vehicle part;
the air layer, formed between the assembly package and the damping layer by a relief-like support of the assembly package, has a thickness of about 0.2 mm.

13. The multi-functional insulation according to claim 9, wherein the damping layer has a thickness of about 2.0 mm and comprises an ultra-light EPDM damping material with an area-weight of about 2.4 kg/m$^2$ and a relief-like structured surface; wherein
the damping layer has a first side and a second side, said first side lies with the relief-like structured surface on the sheet-like vehicle part so that the air layer, formed between the relief-like structured surface of the damping layer and the sheet-like vehicle part, at least in regions, has a thickness of about 0.2 mm, and said second side is fastened to the porous resilient layer.

14. The multi-functional insulation according to claim 9, wherein the damping layer comprises an about 4 mm thin moulded foam layer with an effective spacial weight of about 40 kg/m$^3$ or an area-weight of about 0.2 kg/m$^2$ and having a relief-like structured surface; wherein
the damping layer has a first side and a second side, said first side lies with the relief-like structured surface on the sheet-like vehicle part so that the air layer, formed between the relief-like structured surface of the damping layer and the sheet-like vehicle part, at least in regions, has a thickness of about 0.2 mm, and said second side is fastened to the porous resilient layer.

15. The multi-functional insulation according to claim 5 wherein, when used for the floor insulation, the assembly package comprises a decor layer of about 5 mm thickness and an area-weight of 0.4 kg/m$^2$ to 1.0 kg/m$^2$.

16. The multi-functional insulation according to claim 5, wherein, when used for the end wall insulation, the assembly package further comprises a decor layer of about 5 mm thickness and an area-weight of 0.4 kg/m$^2$ to 1.0 kg/m$^2$.

17. The multi-functional insulation according to claim 1 wherein, when used for the roof inner covering, the assembly package comprises a relief-like structured surface which, while forming an air layer, is adhesed to the sheet-like vehicle part; and
the porous resilient layer comprises a stiff thermomoulded foam layer with a compression modulus of more than 120,000 Pa, with a thickness of about 13 mm to 17 mm and with an area-weight of 0.2 kg/m$^2$ to 0.4 kg/m$^2$; and
the microporous stiffening layer has a thickness of 1.5 mm to 2.0 mm and an area-weight of 0.4 kg/m$^2$ to 0.6 kg/m$^2$; and further comprising
a porous decor layer having a thickness of about 2 mm and an area-weight of about 0.21 kg/m$^2$.

18. The multi-functional insulation according to claim 1 wherein, when used for the roof inner covering, the assembly package comprises a relief-like structured surface which, while forming an air layer, is adhesed to the sheet-like vehicle part; and
the porous resilient layer comprises an open-pored soft PU moulded foam layer with a compression modulus of less than 60 kPa, with a thickness of about 20 mm and with an area-weight of 0.8 kg/m$^2$; and
the microporous stiffening layer has a thickness of 1.5 mm to 2.0 mm and an area-weight of 0.4 kg/m$^2$ to 0.6 kg/m$^2$; and further comprising
a porous decor layer having a thickness of about 2 mm and an area-weight of about 0.21 kg/m$^2$.

19. The multi-functional insulation according to claim 1 wherein, when used for the roof inner covering, the assembly package comprises a relief-like structured surface which, while forming an air layer, is adhesed to the sheet-like vehicle part; and
the porous resilient layer comprises a thermoplastic mixed fibre fleece with a density of less than 35 kg/m$^3$, with a thickness of about 20 mm and with an area-weight of 0.7 kg/m$^2$; and
the microporous stiffening layer has a thickness of 1.5 mm to 2.0 mm and an area-weight of 0.4 kg/m$^2$ to 0.6 kg/m$^2$; and further comprising
a porous decor layer having a thickness of about 2 mm and an area-weight of about 0.21 kg/m$^2$.

20. The multi-functional insulation according to claim 1 wherein, when used for the roof inner covering, the assembly package comprises a relief-like structured surface which, while forming an air layer is adhesed to the sheet-like vehicle part; and
- the porous resilient layer comprises a duroplastic mixed fibre fleece with a density of less than 50 kg/m$^3$, with a thickness of about 20 mm and with an area-weight of about 1.0 kg/m$^2$; and
- the microporous stiffening layer has a thickness of 1.5 mm to 2.0 mm and an area-weight of 0.4 kg/m$^2$ to 0.6 kg/m$^2$; and further comprising
- a porous decor layer having a thickness of about 2 mm and an area-weight of about 0.21 kg/m$^2$.

21. The multi-functional insulation according to claim 1 wherein, when used for the roof inner covering, the assembly package comprises a relief-like structured surface which, while forming an air layer, bears against the sheet-like vehicle part, the assembly package additionally comprising:
- an open-pored, stiff carrier layer; and
- the porous resilient layer comprises a stiff thermomoulded foam layer with a compression modulus of more than 120,000 Pa, with a thickness of about 13 mm to 17 mm and with an area-weight of 0.2 kg/m$^2$ to 0.4 kg/m$^2$; and
- the microporous stiffening layer has a thickness of 1.5 mm to 2.0 mm and an area-weight of 0.4 kg/m$^2$ to 0.6 kg/m$^2$; and further comprising
- a porous decor layer having a thickness of about 2 mm and an area-weight of about 0.21 kg/m$^2$.

22. The multi-functional insulation according to claim 1 wherein, when used for the roof inner covering, the assembly package comprises a relief-like structured surface which, while forming an air layer, bears against the sheet-like vehicle part, and additionally comprising:
- an open-pored, stiff carrier layer;
- the porous resilient layer comprising an open-pored soft PU moulded foam layer with a compression modulus of less than 60 kPa, with a thickness of about 20 mm and an area-weight of about 0.8 kg/m$^2$; and
- the microporous stiffening layer has a thickness of 1.5 mm to 2.0 mm and an area-weight of 0.4 kg/m$^2$ to 0.6 kg/m$^2$; and further comprising
- a porous decor layer having a thickness of about 2 mm and an area-weight of about 0.21 kg/m$^2$.

23. The multi-functional insulation according to claim 1 wherein, when used for the roof inner covering, the assembly package comprises a relief-like structured surface which, while forming an air layer, bears against the sheet-like vehicle part, and additionally comprising:
- an open-pored, stiff carrier layer; and
- the porous resilient layer comprises a thermoplastic mixed fibre fleece with a density of less than 35 kg/m$^3$, with a thickness of about 20 mm and with an area-weight of about 0.7 kg/m$^2$; and
- the microporous stiffening layer has a thickness of 1.5 mm to 2.0 mm and an area-weight of 0.4 kg/m$^2$ to 0.6 kg/m$^2$; and further comprising
- a porous decor layer having a thickness of about 2 mm and an area-weight of about 0.21 kg/m$^2$.

24. The multi-functional insulation according to claim 1 wherein, when used for the roof inner covering, the assembly package comprises a relief-like structured surface which, while forming an air layer, bears against the sheet-like vehicle part, and additionally comprises:
- an open-pored, stiff carrier layer; and
- the porous resilient layer comprises a duroplastic mixed fibre fleece with a density of less than 50 kg/m$^3$, with a thickness of about 20 mm and with an area-weight of about 1.0 kg/m$^2$; and
- the microporous stiffening layer has a thickness of 1.5 mm to 2.0 mm and an area-weight of 0.4 kg/m$^2$ to 0.6 kg/m$^2$; and further comprising
- a porous decor layer having a thickness of about 2 mm and an area-weight of about 0.21 kg/m$^2$.

25. The multi-functional insulation according to claim 21 wherein, when used for the roof inner covering, between the assembly package and the sheet-like vehicle part, at least partially, there is disposed a damping layer which comprises a moulded foam with a thickness of about 4 mm and an area-weight of about 0.2 kg/m$^2$.

26. The multi-functional insulation according to claim 1 wherein, when used for the door covering an about 25 μmm thin PU foil with about 0.003 kg/m$^2$ surface weight is provided between the air layer and the assembly package;
- the porous resilient layer comprising an about 15 mm thick thermomoulded foam with an area-weight of about 0.3 kg/m$^2$.

27. The multi-functional insulation according to claim 1 wherein, when used for the door covering, an about 25 μm thin PU foil with about 0.003 kg/m$^2$ surface weight is provided between the air layer and the assembly package;
- the porous resilient layer comprising an about 15 mm thick moulded foam layer with an area-weight of about 0.6 kg/m$^2$ to 0.9 kg/m$^2$.

28. The multi-functional insulation according to claim 1 wherein, when used for the door covering, an about 25 μm thin PU foil with about 0.003 kg/m$^2$ surface weight is provided between the air layer and the assembly package;
- the porous resilient layer comprising an about 15 mm thick thermoplastic mixed fibre fleece with a density of less than about 35 kg/m$^3$ and an area-weight of about 0.5 kg/m$^2$.

29. The multi-functional insulation according to claim 1 wherein, when used for the door covering, an about 25 μm thin PU foil with about 0.003 kg/m$^2$ surface weight is provided between the air layer and the assembly package;
- the porous resilient layer comprising an about 15 mm thick duroplastic mixed fibre fleece with a density of less than about 50 kg/m$^3$ and an area-weight of about 0.75 kg/m$^2$.

30. The multi-functional insulation according to claim 26, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin aluminum foil.

31. The multi-functional insulation according to claim 26, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin foil of fibre-reinforced plastic paper, wherein the area-weight of the multi-layered damping layer is about 2.54 kg/m$^2$.

32. The multi-functional insulation according to claim 1 wherein:
- the porous resilient layer further comprises a 15 mm thick thermomoulded foam with an area-weight of about 0.3 kg/m$^2$.

33. The multi-functional insulation according to claim 1 wherein:

the porous resilient layer further comprises an about 15 mm thick PU moulded foam with an area-weight of about 0.6 kg/m² to 0.9 kg/m².

34. The multi-functional insulation according to claim 1 wherein:
the porous resilient layer further comprises an about 15 mm thick duroplastic mixed fibre fleece of heat-resistant fibres and with an area-weight of about 0.7 kg/m² to 1.0 kg/m².

35. The multi-functional insulation according to claim 32 wherein a dirt-resistant protective fleece is provided between the air layer and the assembly package, said dirt-resistant protective fleece having an area-weight of 0.05 kg/m² to 0.15 kg/m².

36. The multi-functional insulation according to claim 1, wherein the microporous stiffening layer is disposed between the porous resilient layer and the air layer.

37. The multi-functional insulation according to claim 36 wherein, when used for the end wall insulation of a motor space side;
the microporous stiffening layer comprises a highly pressed fibre material with a thickness of about 2.5 mm and an area-weight of about 1.0 kg/m²;
the porous resilient layer comprises an about 15 mm thick thermomoulded foam with an area-weight of about 0.3 kg/m²; and
further comprising a dirt-resistant protective layer on the motor space side with a thickness of 0.2 to 0.4 mm and an area-weight of 0.1 to 0.3 kg/m².

38. The multi-functional insulation according to claim 36 wherein, when used for the end wall insulation of a motor space side;
the microporous stiffening layer comprises a highly pressed fibre material with a thickness of about 2.5 mm and an area-weight of about 1.0 kg/m²;
the porous resilient layer comprises an about 15 mm thick PU moulded foam with an area-weight of about 0.6 kg/m² to 0.9 kg/m²; and
further comprising a dirt-resistant protective layer on the motor space side with a thickness of 0.2 to 0.4 mm and an area-weight of 0.1 to 0.3 kg/m².

39. The multi-functional insulation according to claim 36 wherein, when used for the end wall insulation of a motor space side;
the microporous stiffening layer comprises a highly pressed fibre material with a thickness of about 2.5 mm and an area-weight of about 1.0 kg/m²;
the porous resilient layer comprises an about 15 mm thick duroplastic mixed fibre fleece of heat-resistant fibres with an area-weight of about 0.7 kg/m² to 1.0 kg/m²; and
further comprising a dirt-resistant protective layer on the motor space side with a thickness of 0.2 to 0.4 mm and an area-weight of 0.1 to 0.3 kg/m².

40. The multi-functional insulation according to claim 32 wherein, between the air layer and the assembly package a foam damping layer having a thickness of 3.0 mm and an area-weight of about 0.12 kg/m² is provided.

41. The multi-functional insulation according to claim 1 wherein the sheet-like vehicle part is an about 0.8 mm thick steel sheeting.

42. The multi-functional insulation according to claim 1 wherein the sheet-like vehicle part is an about 1.1 mm thick aluminum sheeting.

43. The multi-functional insulation according to claim 1 wherein the sheet-like vehicle part is an about 1.5 mm thick fibre-reinforced plastic part.

44. The multi-functional insulation according to claim 1 wherein the porous resilient layer has a heat conductability $\lambda$ of less than 0.05 W/mK.

45. A multi-layered assembly package for a multi-functional insulation for use in vehicles, which is sound-absorbing, sound-insulating, oscillation-damping and heat-insulating, said multi-layered assembly package having several layers, the assembly package comprising: a microporous stiffening layer which has a total airflow resistance of $R_t=500$ Nsm$^{-3}$ to $R_t=2500$ Nsm$^{-3}$, and an areal-mass of $m_F=0.3$ kg/m² to $m_F=2.0$ kg/m², and wherein said multi-layered assembly package is a heavy-layer free package.

46. The multi-layered assembly package according to claim 45, wherein the microporous stiffening layer has a bending stiffness of B=0.005 Nm to B=10.5 Nm.

47. The multi-layered assembly package according to claim 45, wherein the assembly package further comprises a layer selected from the group comprising a damping layer and an adhesive layer.

48. The multi-functional insulation according to claim 10 wherein, when used for the floor insulation, the assembly package further comprises a decor layer of about 5 mm thickness and an area-weight of 0.4 kg/m² to 1.0 kg/m².

49. The multi-functional insulation according to claim 10 wherein, when used for the end wall insulation, the assembly package further comprises a decor layer of about 5 mm thickness and an area-weight of 0.4 kg/m² to 1.0 kg/m².

50. The multi-functional insulation according to claim 37, wherein a foam damping having a thickness of 3.0 mm and an area-weight of about 0.12 kg/m² is provided between the air layer and the assembly package.

51. The multi-functional insulation according to claim 1 wherein the porous resilient layer comprises an open-pored foam layer.

52. The multi-functional insulation according to claim 1 wherein the microporous stiffening layer comprises a layer selected from the group comprising an open-pored fibre layer and a fibre/foam composite layer.

53. The multi-functional insulation according to claim 1 wherein the microporous stiffening layer has a total airflow resistance of $R_t=900$ Nsm$^{-3}$ to $R_t=2000$ Nsm$^{-3}$, and an areal-mass of $m_F=0.5$ kg/m² to $m_F=1.6$ kg/m².

54. The multi-functional insulation according to claim 2 wherein the microporous stiffening layer has a bending stiffness of B=0.025 Nm to B=6.0 Nm.

55. The multi-functional insulation according to claim 5 wherein the thermomoulded foam has a density of $\rho \leq 15$ kg/m³.

56. The multi-functional insulation according to claim 6 wherein the PU moulded foam has a density of $\rho \leq 45$ kg/m³.

57. The multi-functional insulation according to claim 7 wherein the thermoplastic mixed fibre fleece has a density of $\rho \leq 35$ kg/m³.

58. The multi-functional insulation according to claim 8 wherein the duroplastic fibre fleece has a density of $\rho \leq 50$ kg/m³.

59. The multi-functional insulation according to claim 13 wherein the EPDM damping material is bitumen-free.

60. The multi-functional insulation according to claim 21 wherein the open-pored, stiff carrier layer is selected from the group comprising a highly pressed, microporous fibre material and a honeycomb-like constructed carrier material, of about 3 to 5 mm thickness and an area-weight of 0.4 to 0.6 kg/m².

61. The multi-functional insulation according to claim 22 wherein the open-pored, stiff carrier layer is selected from the group comprising a highly pressed, microporous fibre material and a honeycomb-like constructed carrier material, of about 3 to 5 mm thickness and an area-weight of 0.4 to 0.6 kg/m$^2$.

62. The multi-functional insulation according to claim 23 wherein the open-pored, stiff carrier layer is selected from the group comprising a highly pressed, microporous fibre material and a honeycomb-like constructed carrier material, of about 3 to 5 mm thickness and an area-weight of 0.4 to 0.6 kg/m$^2$.

63. The multi-functional insulation according to claim 24 wherein the open-pored, stiff carrier layer is selected from the group comprising a highly pressed, microporous fibre material and a honeycomb-like constructed carrier material, of about 3 to 5 mm thickness and an area-weight of 0.4 to 0.6 kg/m$^2$.

64. The multi-functional insulation according to claim 32 wherein the dirt-resistant protective layer further comprises an oil and water resistant protective fleece.

65. The multi-functional insulation according to claim 33 wherein the dirt-resistant protective layer further comprises an oil and water resistant protective fleece.

66. The multi-functional insulation according to claim 34 wherein the dirt-resistant protective layer further comprises an oil and water resistant protective fleece.

67. The multi-functional insulation according to claim 35 wherein the dirt-resistant protective fleece further comprises an oil and water resistant protective fleece.

68. The multi-functional insulation according to claim 37 wherein the dirt-resistant protective layer is a water and oil resistant fibre fleece.

69. The multi-functional insulation according to claim 38 wherein the dirt-resistant protective layer is a water and oil resistant fibre fleece.

70. The multi-functional insulation according to claim 39 wherein the dirt-resistant protective layer is a water and oil resistant fibre fleece.

71. The multi-functional insulation according to claim 43, wherein the fibre-reinforced plastic part is preferably organo-sheeting.

72. The multi-functional insulation according to claim 44, wherein the porous resilient layer has a heat conductability λ of preferably 0.04 W/mK.

73. The assembly package according to claim 47 wherein the assembly package further comprises a damping layer and an adhesive layer.

74. The multi-functional insulation according to claim 9 wherein:
the porous resilient layer has a thickness of about 25 mm and a surface weight of about 0.4 kg/m$^2$ to 1.75 kg/m$^2$; and
the microporous stiffening layer has a thickness of 1.5 mm to 5.0 mm and an area-weight of 0.6 kg/m$^2$ to 1.6 kg/m$^2$.

75. The multi-functional insulation according to claim 6, wherein, when used for the floor insulation, the assembly package comprises a decor layer of about 5 mm thickness and an area-weight of 0.4 kg/m$^2$ to 1.0 kg/m$^2$.

76. The multi-functional insulation according to claim 6, wherein, when used for the end wall insulation, the assembly package further comprises a decor layer of about 5 mm thickness and an area-weight of 0.4 kg/m$^2$ to 1.0 kg/m$^2$.

77. The multi-functional insulation according to claim 7, wherein, when used for the floor insulation, the assembly package comprises a decor layer of about 5 mm thickness and an area-weight of 0.4 kg/m$^2$ to 1.0 kg/m$^2$.

78. The multi-functional insulation according to claim 7, wherein, when used for the end wall insulation, the assembly package further comprises a decor layer of about 5 mm thickness and an area-weight of 0.4 kg/m$^2$ to 1.0 kg/m$^2$.

79. The multi-functional insulation according to claim 8, wherein, when used for the floor insulation, the assembly package comprises a decor layer of about 5 mm thickness and an area-weight of 0.4 kg/m$^2$ to 1.0 kg/m$^2$.

80. The multi-functional insulation according to claim 8, wherein, when used for the end wall insulation, the assembly package further comprises a decor layer of about 5 mm thickness and an area-weight of 0.4 kg/m$^2$ to 1.0 kg/m$^2$.

81. The multi-functional insulation according to claim 9, wherein, when used for the floor insulation, the assembly package comprises a decor layer of about 5 mm thickness and an area-weight of 0.4 kg/m$^2$ to 1.0 kg/m$^2$.

82. The multi-functional insulation according to claim 9, wherein, when used for the end wall insulation, the assembly package further comprises a decor layer of about 5 mm thickness and an area-weight of 0.4 kg/m$^2$ to 1.0 kg/m$^2$.

83. The multi-functional insulation according to claim 22 wherein, when used for the roof inner covering, between the assembly package and the sheet-like vehicle part, at least partially, there is disposed a damping layer which comprises a moulded foam with a thickness of about 4 mm and an area-weight of about 0.2 kg/m$^2$.

84. The multi-functional insulation according to claim 23 wherein, when used for the roof inner covering, between the assembly package and the sheet-like vehicle part, at least partially, there is disposed a damping layer which comprises a moulded foam with a thickness of about 4 mm and an area-weight of about 0.2 kg/m$^2$.

85. The multi-functional insulation according to claim 24 wherein, when used for the roof inner covering, between the assembly package and the sheet-like vehicle part, at least partially, there is disposed a damping layer which comprises a moulded foam with a thickness of about 4 mm and an area-weight of about 0.2 kg/m$^2$.

86. The multi-functional insulation according to claim 1 wherein
the microporous stiffening layer has a thickness of about 1 mm to 1.5 mm and an area-weight of about 0.5 kg/m$^2$; and
further comprising an open-pored decor layer having an area-weight of about 0.21 kg/m$^2$ and a thickness of about 2 mm.

87. The multi-functional insulation according to claim 27, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin aluminum foil.

88. The multi-functional insulation according to claim 27, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin foil of fibre-reinforced plastic paper, wherein the area-weight of the multi-layered damping layer is about 2.54 kg/m$^2$.

89. The multi-functional insulation according to claim 28, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin aluminum foil.

90. The multi-functional insulation according to claim 28, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin foil of fibre-reinforced plastic paper, wherein the area-weight of the multi-layered damping layer is about 2.54 kg/m$^2$.

91. The multi-functional insulation according to claim 29, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin aluminum foil.

92. The multi-functional insulation according to claim 29, wherein the sheet-like vehicle part, at least partially, is provided with a damping layer, which comprises a multi-layered, about 2.3 mm thick ultra-light damping material, with an area-weight of about 2.67 kg/m$^2$ and with at least an about 0.1 mm thin foil of fibre-reinforced plastic paper, wherein the area-weight of the multi-layered damping layer is about 2.54 kg/m$^2$.

93. The multi-functional insulation according to claim 1, wherein when used for the end wall insulation of a motor space side further comprises:

a dirt-resistant protective layer;

the microporous stiffening layer being disposed between the porous resilient layer and the dirt-resistant protective layer and comprises a highly pressed fibre material with a thickness of about 2.5 mm and an area-weight of about 1.0 kg/m$^2$;

the dirt-resistant protective layer having a thickness of 0.2 to 0.4 mm and an area-weight of 0.1 to 0.3 kg/m$^2$.

94. The multi-functional insulation according to claim 33 wherein a dirt-resistant protective fleece is provided between the air layer and the assembly package, said dirt-resistant protective fleece having an area-weight of 0.05 kg/m$^2$ to 0.15 kg/m$^2$.

95. The multi-functional insulation according to claim 33 wherein, between the air layer and the assembly package a foam damping layer having a thickness of 3.0 mm and an area-weight of about 0.12 kg/m$^2$ is provided.

96. The multi-functional insulation according to claim 34 wherein a dirt-resistant protective fleece is provided between the air layer and the assembly package, said dirt-resistant protective fleece having an area-weight of 0.05 kg/m$^2$ to 0.15 kg/m$^2$.

97. The multi-functional insulation according to claim 34 wherein, between the air layer and the assembly package a foam damping layer having a thickness of 3.0 mm and an area-weight of about 0.12 kg/m$^2$ is provided.

98. The assembly package according to claim 46, wherein the assembly package further comprises a layer selected from the group comprising a damping layer and an adhesive layer.

99. The assembly package according to claim 98 wherein the assembly package further comprises a damping layer and an adhesive layer.

100. The assembly package according to claim 45 wherein the microporous stiffening layer has a total airflow resistance of $R_t=900$ Nsm$^{-3}$ to $R_t=2000$ Nsm$^3$, and an areal-mass of $m_F=0.5$ kg/m$^2$ to $m_F=1.6$ kg/m$^2$.

101. The assembly package according to claim 46 wherein the microporous stiffening layer has a bending stiffness of $B=0.025$ Nm to $B=6.0$ Nm.

* * * * *

UNITED STATES PATENT AND TRADEMARK OFFICE
CERTIFICATE OF CORRECTION

PATENT NO. : 6,145,617

DATED : November 14, 2000

INVENTOR(S) : Alts

It is certified that error appears in the above-identified patent and that said Letters Patent is hereby corrected as shown below:

Claim 3, line 3, change "comprising" to --consisting of --

Claim 3, line 4, change "or" to --and--

Claim 9, line, 1, change "5" to --1--

Claim 47, line 3, change "comprising" to --consisting of--

Claim 52, line 3, change " comprising" to --consisting of--

Claim 60, line 3, change " comprising" to --consisting of--

UNITED STATES PATENT AND TRADEMARK OFFICE
CERTIFICATE OF CORRECTION

PATENT NO.      : 6,145,617

DATED           : November 14, 2000

INVENTOR(S)  : Alts

It is certified that error appears in the above-identified patent and that said Letters Patent is hereby corrected as shown below:

Claim 61, line 3, change "comprising" to --consisting of --

Claim 62, line 3, change "comprising" to --consisting of--

Claim 63, line 3, change " comprising" to --consisting of--

Claim 98, line 3, change " comprising" to --consisting of--

Signed and Sealed this

Twenty-ninth Day of May, 2001

NICHOLAS P. GODICI

*Attest:*

*Attesting Officer*       Acting Director of the United States Patent and Trademark Office

UNITED STATES PATENT AND TRADEMARK OFFICE
CERTIFICATE OF CORRECTION

PATENT NO.   : 6,145,617
DATED        : November 14, 2000
INVENTOR(S)  : Thorsten Alts It is certified that error appears in the above-identified patent and that said Letters Patent is hereby corrected as shown below:

<u>Column 10,</u>
Line 17, change "25µmm" to -- 25µm --.

Signed and Sealed this

Eighteenth Day of February, 2003

JAMES E. ROGAN
*Director of the United States Patent and Trademark Office*